(12) United States Patent
Breton et al.

(10) Patent No.: US 7,578,875 B2
(45) Date of Patent: Aug. 25, 2009

(54) BLACK INKS AND METHOD FOR MAKING SAME

(75) Inventors: Marcel P. Breton, Mississauga (CA);
Raymond W. Wong, Mississauga (CA);
Christine E. Bedford, Burlington (CA);
Christopher Wagner, Toronto (CA);
Caroline Turek, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 397 days.

(21) Appl. No.: 11/291,283

(22) Filed: Nov. 30, 2005

(65) Prior Publication Data
US 2007/0119337 A1    May 31, 2007

(51) Int. Cl.
*C09D 11/00* (2006.01)
(52) U.S. Cl. .................................... 106/31.29
(58) Field of Classification Search ............. 106/31.29; 528/339.5; 523/160; 156/334; 347/102; 525/285
See application file for complete search history.

(56) References Cited

U.S. PATENT DOCUMENTS

| | | | | |
|---|---|---|---|---|
| 4,889,560 A | * | 12/1989 | Jaeger et al. | |
| 4,889,761 A | * | 12/1989 | Titterington et al. | |
| 5,151,120 A | * | 9/1992 | You et al. | 106/31.29 |
| 5,221,335 A | * | 6/1993 | Williams et al. | |
| 5,286,799 A | * | 2/1994 | Harrison et al. | 525/285 |
| 5,372,852 A | * | 12/1994 | Titterington et al. | |
| 5,496,879 A | * | 3/1996 | Griebel et al. | |
| 5,621,022 A | * | 4/1997 | Jaeger et al. | |
| 5,777,183 A | * | 7/1998 | Mueller et al. | 568/905 |
| 5,783,657 A | * | 7/1998 | Pavlin et al. | |
| 5,863,319 A | * | 1/1999 | Baker et al. | 106/31.29 |
| 5,998,570 A | * | 12/1999 | Pavlin et al. | |
| 6,111,055 A | * | 8/2000 | Berger et al. | |
| 6,476,096 B1 | * | 11/2002 | Molloy et al. | 523/160 |
| 6,552,160 B2 | * | 4/2003 | Pavlin | 528/339.5 |
| 6,585,816 B1 | * | 7/2003 | Smith et al. | 106/31.29 |
| 6,726,798 B2 | * | 4/2004 | Boege et al. | 156/334 |
| 6,811,596 B1 | * | 11/2004 | Bedford et al. | 106/31.29 |
| 6,989,052 B1 | * | 1/2006 | Wu et al. | 106/31.29 |
| 2003/0103123 A1 | * | 6/2003 | Snyder | 347/102 |
| 2004/0102540 A1 | * | 5/2004 | Jaeger et al. | 523/160 |

FOREIGN PATENT DOCUMENTS

| | | | |
|---|---|---|---|
| DE | 4205636AL | * | 2/1992 |
| DE | 4205713AL | * | 2/1992 |
| WO | WO98/17705 | * | 4/1998 |

OTHER PUBLICATIONS

U.S. Appl. No. 11/004,332, filed Dec. 4, 2004.*
U.S. Appl. No. 11/004,333, filed Dec. 4, 2004.*

* cited by examiner

*Primary Examiner*—Melvin C Mayes
*Assistant Examiner*—Stefanie Cohen
(74) *Attorney, Agent, or Firm*—Marger Johnson & McCollom, PC

(57) ABSTRACT

Disclosed is a phase change black ink composition comprising (1) a low polarity ink carrier comprising (A) an ester-terminated polyamide, (B) a Guerbet alcohol or a Guerbet alcohol mixture including at least one linear alcohol, and (C) a low polarity wax, and (2) a black colorant. The ink carrier can also include a dispersant. The ink is resistant to aggregation and settling of the black colorant when a standby-mode printer temperature for the ink is not more than about the gel temperature of the ink.

28 Claims, No Drawings

BLACK INKS AND METHOD FOR MAKING SAME

BACKGROUND

Disclosed herein are black phase change inks and methods for making same. In one embodiment the black phase change ink composition can comprise (1) a low polarity ink carrier comprising (A) an ester-terminated polyamide, (B) a Guerbet alcohol or a Guerbet alcohol mixture including at least one linear alcohol, and (C) a low polarity wax, and (2) a black colorant. The ink carrier can also include a dispersant. The ink can be resistant to substantial aggregation and settling of the black colorant at the standby-mode printer temperature for the ink and up to about the jetting temperature of the ink. In one embodiment, the phase change ink can be a low energy black phase change ink.

Another embodiment is directed to a method which comprises (a) incorporating into an ink jet printing apparatus the above-described phase change ink composition; (b) melting the ink; (c) causing droplets of the melted ink to be ejected in an image wise pattern onto an intermediate transfer member; and (d) transferring the ink in the image wise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the printhead operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

U.S. Pat. No. 5,783,657, U.S. Pat. No. 5,998,570 and WO 98/17704, (Pavlin et al), the disclosures of each of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50 percent of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dime racid-based polyamide is prepared by thermal condensation of a diacid, a diamine and a monoalcohol.

Compositions suitable for use as phase change ink carrier compositions are known and are described in U.S. patent application Ser. No. 10/881,047, now U.S. Pat. No. 6,989,052 the disclosure of which is totally incorporated herein by reference.

A need remains for improved phase change inks, and more specifically, low energy solid inks which permit phase change ink jet printers to perform at more moderate operating conditions than with conventional phase change inks. For example, a need exists for phase change inks which can be jetted at temperature lower than conventional jetting temperature as described below. However, black colorants commonly used in phase change inks can interfere with the gelling process at these lower than conventional operating conditions and might therefore present difficulties for black ink compositions during low energy operation. While these black inks give excellent print quality and performance at higher energy levels, there is still a need for black inks that minimize penetration of the colorant in the paper during the transfer/fusing stage of the printing process for minimum show through after fusing at low energy conditions. Additionally, there is a need to eliminate problems associated with black dye diffusion at reduced operating temperatures. Furthermore, there is a need for black phase change inks that generate prints with good performance in automatic document feeders. Additionally, there is a need for stable (no settling of pigment) black dispersions. Thus, a need exists for a black phase change ink which is resistant to aggregation and settling of the black pigment particles, and more particularly, in a phase change ink jet printer, when the standby-mode printer temperature for the ink is at less than the temperature at which the gel transition for an ink is observed. Additionally, a need remains for black phase change inks that print successfully on paper and transparency stock. Moreover, there is a need for black phase change inks that generate prints with good performance in automatic document feeders.

SUMMARY

Many phase change inks currently being used in solid ink jet piezoelectric printers employ high jetting temperatures (about 140 degrees C.) and long warm up times. The images currently produced by these inks can also, in many instances, exhibit poor scratch resistance and image permanence.

Disclosed herein is a black phase change ink composition comprising (1) a low polarity ink carrier comprising (A) an ester-terminated polyamide, (B) a Guerbet alcohol or a Guerbet alcohol mixture with at least one linear alcohol, and (C) a low polarity wax, and (2) a black colorant. In a further embodiment the ink carrier can include a dispersant. In another embodiment the black phase change ink composition can be low energy in nature.

A method can also be provided which comprises forming the above-described ink; (b) melting the ink; and (c) causing droplets of the melted ink to be ejected in an image wise pattern onto a substrate.

DETAILED DESCRIPTION

A problem with many current phase change inks is that they can suffer from poor robustness. This problem is magnified for the low energy phase change inks. Within the context of this application, low energy phase change inks are defined as those for with at least one of the following printing process temperatures: 1) jetting temperature; 2) standby temperature; and 3) intermediate drum temperature, is below the set temperatures for a solid ink printer such as the Xerox Phaser 860. The jetting temperature for a low energy phase change ink in one embodiment is less than about 135° C., in another embodiment the stand-by temperature is less than about 105° C., and in a further embodiment the intermediate drum temperature is less than about 65° C.

In an embodiment, robustness can be increased by adding a gellant to the vehicle. Inks containing gellants are described in U.S. Pat. Nos. 6,906,118, 6,761,758, 6,811,595, 6,860,928, and 6,872,243, the disclosures of which are incorporated herein in their entirety by reference. In these inks, the gels can be created through the initial assembly of the gelator molecules into fibrous nanostructure which then further form into a three dimensional lattice, trapping the solvents within the voids of the network. Gels can be formed by small organic molecules in organic solvents and are often referred to physical gels. In these systems, the three dimensional network can be held together by non-covalent bonds such as hydrogen bonding and Van Der Waals interactions. In one embodiment, the molten vehicle can be trapped in these three dimensional networks, giving a more robust ink upon solidification.

A gellant can also be added to the vehicle to make the ink more robust and assist in controlling transfuse properties. The gelling agent can also facilitate the control of drop spreading on the intermediate substrate when the inks are used in an indirect printing process, providing for improved image uniformity and dot to dot coalescence on the intermediate substrate prior to transfer. These improvements in turn can result in increase overall print quality. The gelling agent can make the ink tough by undergoing physical cross linking with the molten vehicle. The gellant can enable a thermally-controlled and reversible viscoelastic gel phase change of the molten ink.

In a further embodiment, adding a gelling agent can modify the rheological profile of the ink often recognized by the presence of a viscosity plateau at temperatures above the ink crystallization temperature. This can be described as the gel state. In this state, the gelled inks exhibit visco-elastic rheological characteristics that are different from those of conventional hot melt or phase change inks in that they show an elastic behavior in a temperature region where the ink is supposed to be in the liquid state. The gel state can have a gel point, associated with the onset of gelation upon cooling. The gel point is evidenced by the crossover of G' (storage modulus) and G" (loss modulus), with G' being higher than G", indicating that the material is elastic.

The gel point can in one embodiment be at a temperature equal to or less than about 110° C., in another embodiment equal to or less than about 95° C., and in a further embodiment equal to or less than about 90° C., although the temperature can be outside of these ranges. In still a further embodiment, the gel point is at a temperature above the melting point of the phase change ink carrier.

Upon cooling, gelation can occur before crystallization. The crystallization temperature in one embodiment is equal to or less than about 95° C., in another embodiment equal to or less than about 90° C., and in a further embodiment equal to or less than about 85° C., although the temperature can be outside of these ranges.

A low energy black phase change ink composition can be produced comprising (1) a low polarity ink carrier comprising (A) an ester-terminated polyamide, (B) a Guerbet alcohol or a Guerbet alcohol mixture with at least one linear alcohol, and (C) a low polarity wax, (2) a dispersant, and (3) a black colorant.

These phase change black ink compositions can be designed to meet the conditions for low energy printing. These low energy black inks can, in some embodiments, have advantages over existing solid dye based and/or high melting black inks. In one embodiment, the black inks can facilitate control of the penetration of the ink into the paper during the transfer/fusing stage of the printing process for minimum show through over a wide range of transfuse conditions. In another embodiment, black inks, such as carbon black inks, can exhibit substantially none of the problems associated with the use of dye colorants such as intercolor bleed or slow diffusion of the colorant from one ink to the other. Furthermore, these low energy inks can be stable (substantially resistant to settling and/or aggregation of the pigment particles) black dispersions. In a further embodiment, the molten black ink can be filtered through a 0.45 micron glass fiber filter at temperatures from about 110° C. up to equal to or less than about 135° C. In one embodiment, a one hundred gram sample of the ink can be filtered through the 0.45 micron filter in an amount of time equal to or less than 20 seconds, in another embodiment equal to or less than 10 seconds, and in a further embodiment equal to or less than 5 seconds. After aging for one week at 135° C., a 100 g aliquot of the same ink has similar filtration characteristics. In addition the ratio of the filtration time of the aged ink with respect to the non-aged ink in one embodiment is equal to or less than about 1.5, in another embodiment equal to or less than about 1.2, and in a further embodiment equal to or less than about 1.0. The filtration data can be obtained under a substantially constant pressure. In one embodiment this substantially constant pressure is equal to or less than about 30 psi, in another embodiment equal to or less than about 25 psi, in a further embodiment equal to or less than 20 psi, and in still a further embodiment equal to or less than about 15 psi, These ink compositions can be designed so that they do not substantially interfere with the process of gelation. This ink carrier system can facilitate the formation of a preponderance of gel structures which in turn can improve resistance to aggregation and settling of the black ink colorant.

The black inks can have many advantages over existing dye based solid inks. They can be lower cost. They can have a lower printhead stand-by temperature in one embodiment of from about 85° C. to equal to or less than about 130° C. The inks can also have a lower jetting temperature in an embodiment of from about 105° C. to equal to or less than about 130° C. When employed in indirect printing processes wherein the ink is first jetted onto a heated intermediate transfer drum and subsequently transferred from the heated drum to a final substrate, these inks can also have a lower drum temperature in one embodiment of from about 45° C. to equal to or less than about 55° C., and in a further embodiment equal to or less than about 20° C. below the drum temperature used for the current phase change ink, about 64 degrees C. Furthermore, the subject inks can be employed using in one embodiment a minimum amount of paper pre-heating, and in another embodiment no paper pre-heating. Moreover, these inks can function in one embodiment from a paper pre-heat temperature of from about 40° C. to temperature equal to or less than 80° C. The inks can in an embodiment be fused or transfused or transferred to a substrate at a load pressure of about 300 psi. Conventional inks are formed at about 700-900 psi loads. The black inks can also enable low pile height, in a further embodiment of from about 5 microns up to or less than about 10 microns for primary colors. This low pile height can facilitate better writeability, lower crease and higher durability.

In another embodiment the above advantages can be enhanced through the use of post-fusing. Thus, the low energy black phase change inks disclosed herein can be further treated with pressure/heat or heat alone to further enhance one or more imaging performance characteristics. In one embodiment, adhesion to paper and scratch resistance can be increased as a result of the ink being moved further into the interstices of the paper substrate. This property can be enabled by the rheology of the black inks which can have equal to or less than about a 20° C. difference between the onset of crystallization, which is one embodiment can be at about 80° C., and the tail end of the melt transition, which in another embodiment can be about 100° C. Upon heating, the ink changes from a solid at room temperature to a high viscosity liquid. In one embodiment, the corresponding temperature range can be from about 80° C. to up to or less than about 95° C. In another embodiment, this can provide an opportunity, in a temperature range of from about 60° C. to up to or less than about 95° C., to post-fuse the image.

A method can also be provided which comprises forming the above-described ink; (b) melting the ink; and (c) causing droplets of the melted ink to be ejected in an image wise pattern onto a substrate. The method can also include a transfuse step. In another embodiment, the method can further include a simultaneous transfuse and fusing step of an image wise pattern. A discussion of direct and indirect printing involving phase change inks is provided in column 21, lines 3 to 35 of U.S. Pat. No. 6,858,070, which is incorporated herein in its entirety by reference.

The low polarity of the ink vehicle can be defined by determining its solubility parameter and that of the ink components. The ink formulation in one embodiment comprises at least about 85% by weight, in another embodiment at least about 90% by weight, and in a further embodiment at least about 95% by weight of the ink carrier, although the % by weight of the ink carrier can be outside of these ranges. Moreover, the ink carrier can have a total solubility parameter (including dispersive, polar and hydrogen bonding components) in one embodiment of equal to or less than about 21 $(MPa)^{0.5}$, in another embodiment equal to or less than about 19 $(MPa)^{0.5}$, and in a further embodiment equal to or less than about 17 $(MPa)^{0.5}$, although the total solubility parameter can be outside of these ranges. The value for the polar component of the total solubility parameter of the components that make up all together in one embodiment at least 85 percent by weight of the ink vehicle, in another embodiment at least 90 percent by weight of the ink vehicle, and in another embodiment at least 95 percent by weight of the ink vehicle, in one embodiment is equal to or less than about 2 $(MPa)^{0.5}$, in another embodiment is equal to or less than about 1.5 $(MPa)^{0.5}$, and in a further embodiment is equal to or less than about 1 $(MPa)^{0.5}$, although the values of the polar component of the solubility parameters can be outside of these ranges.

The subject phase change inks can also have a relatively low surface energy. Typically these inks can have a surface energy which in one embodiment can be equal to or less than about 33 dynes/cm, in another embodiment equal to or less than about 30 dynes/cm, in a further embodiment equal to or less than about 28 dynes/cm, and in another further embodiment equal to or less than about 25 dynes/cm, although the surface energy can be outside of these ranges.

The ink can be resistant to aggregation and settling of the black colorant when the standby-mode printer temperature for the ink is approaching the gel transition temperature of the ink. In one embodiment the gel transition temperature of the ink can be designed to be at least about 5° C., in another embodiment at least about 10° C., and in a further embodiment at least about 15° C., and in one embodiment equal to or less than about 40° C., in another embodiment equal to or less than about 50° C., and in another embodiment equal to or less than about 60° C., below the jetting temperature of the ink, although the onset of the gel transition can be outside of these ranges The low energy black phase change ink can have a minimum show through of the black colorant. Show through can be defined as the increase in optical density that can be measured on the backside of a paper as a result of printing a solid image on the front side of the same paper. In one embodiment the optical density increase can be equal to or less than about 0.1 optical density units, in another embodiment equal to or less than about 0.075 optical density units, and in a further embodiment equal to or less than about 0.05 optical density units, although the showthrough can be outside of these ranges.

An ester-terminated amide can be employed as the gelling/stabilizing agent in the ink carrier disclosed herein. Examples of suitable ester-amide compounds and the preparation thereof are disclosed in, for example, U.S. Pat. No. 5,863,319, U.S. Pat. No. 5,645,632, and U.S. Pat. No. 5,783,657, the disclosures of each of which are totally incorporated herein by reference. Suitable ester-amides are also commercially available as, for example, UNI-REZ® 2980 and UNI-CLEAR® 80 and 100 (commercially available from Arizona Chemical), and the like.

In one specific embodiment, the ester-amide compound has a melting point of at least about 50° C., although the melting point can be outside of this range. In another specific embodiment, the ester-amide compound has a melting point equal to or less than about 160° C., although the melting point can be outside of this range. In a further specific embodiment, the ester-amide compound has a viscosity at about 140° C. of at least about 20 cps, although the viscosity can be outside of this range. In still another specific embodiment, the ester-amide compound has a viscosity at about 140° C. equal to or less than about 400 cps, although the viscosity can be outside of this range.

The material which provides a gel structure to the ink upon cooling is an ester-amide material. The ester-amide can be present in the ink carrier in one embodiment at least about 0.5% by weight, in another embodiment at least about 3% by weight, and in yet another embodiment at least about 6% by weight, and in one embodiment equal to or less than about 20% by weight, in another embodiment equal to or less than about 15% by weight, and in yet another embodiment equal to or less than about 10% by weight, although the amount can be outside of these ranges.

Certain additives can also be introduced to the subject ink carrier to control gelling properties. These additives can facilitate effective gelation of the low energy phase change ink, the process of which conventionally interferes with ink containing substantial concentrations of black dyes. The ink carrier can comprise in one embodiment a high molecular weight alcohol, and in another embodiment a high molecular weight secondary alcohol. In a further embodiment, the secondary alcohol can be a Guerbet alcohol. In an even further embodiment, the Guerbet alcohols can comprise 2-tetradecyl 1-octadecanol and/or 2-hexadecyl-1-eicosanol and mixtures thereof. Other Guerbet alcohols can comprise 2-octadecyl 1-docosanol, 2-nonadecyl 1-tricosanol, 2-eicosyl tetracosanol, and mixtures thereof.

The Guerbet alcohol can be used individually or in mixtures with at least one linear alcohol such as tetradecanol, 1-pentadecanol, 1-hexadecanol, 1-heptadecanol, 1-octadecanol (stearyl alcohol), 1-nonadecanol, 1-eicosanol, 1-docosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol, 1,8 octanediol, 1,9 nonanediol, 1,10 decanediol, 1,12 dodecanediol, 1,13 tridecanediol, 1,14 tetradecanediol, 1,15 pentadecanediol, 1,16 hexandecanediol, 1,17 heptadecanediol, 1,18 octadecanediol, 1,19 nonadecanediol, 1,20 eicosanediol, 1,22 docosanediol, 1,25 pentacosanediol, and mixtures thereof.

The alcohol additive which can control gelling properties of the ink carrier can be present in the ink in one embodiment of at least about 5 percent by weight of the ink carrier, in another embodiment of at least about 7.5 percent by weight of the ink carrier, and in yet another embodiment of at least about 10 percent by weight of the ink carrier, and in one embodiment of equal to or less than about 65 percent by weight of the ink carrier, in another embodiment equal to or less than about 45 percent by weight of the ink carrier, and in yet another embodiment equal to or less than about 35 percent by weight of the ink carrier, although the amount can be outside of these ranges. Specific examples of other suitable alcohol additive to control gelling properties include ISOFOL® 32, 2-tetradecyl 1-octadecanol, commercially available from Condea Vista Company, Austin, Tex. now Sasol Inc, and ISOFOL® 36, 2-hexadecyl-1-eicosanol, commercially available from Condea Vista Company. Also suitable is Isofol 34T, commercially available from Condea Vista Company, a mixture of 2-tetradecyl octadecanol (19-25%), 2-tetradecyleicosanol/2-hexadecyloctadecanol (43-51%) and 2-hexadecyleicosanol (25-31%).

The broadening of the gel transition range can be facilitated by the presence of the Guerbet alcohol. The gel transition in one embodiment has a range of at least about 3° C., in another embodiment at least about 4° C., and in further embodiment at least about 5° C., in one embodiment equal to or less than about 10° C., in another embodiment equal to or less than about 15° C., and in a further embodiment equal to or less than about 20° C., although the gel transition range can be outside of these ranges.

The viscosity within the temperature transition region may not always be a constant. The viscosity in the gel phase can in one embodiment be identified by the presence of one or more plateau-like transition area in a graphical plot of viscosity versus temperature. This plateau-like transition area can be present in a temperature range in one embodiment of at least about 50° C., in another embodiment at least about 65° C., and in a further embodiment equal to or less than about 80° C., and in another embodiment equal to or less than about 105° C., in a further embodiment equal to or less than about 100° C., and in an even further embodiment equal to or less than about 95° C., although the transition area can be outside of these ranges. The viscosity for the plateau-like transition area in one embodiment is at least about 100 cps, in another embodiment is at least about 500 cps, and in a further embodiment is at least about 1000 cps. In this context, the viscosity within the plateau region which can be constant may vary within the gel transition, the rate with which the viscosity is changing being dependent on both the composition of the ink and the analytical conditions used to measure the rheological properties of the ink.

A wax vehicle can also be employed. A polyalkylene wax, such as a polyethylene wax, a polypropylene wax, or mixtures thereof, can also be included in the ink carrier. The polyalkylene wax(es) can be present in the ink carrier in one embodiment of at least about 25 percent by weight of the ink carrier, in another embodiment of at least about 30 percent by weight of the ink carrier, and in yet another embodiment of at least about 35 percent by weight of the ink carrier, and in one embodiment equal to or less than about 65 percent by weight of the ink carrier, in another embodiment equal to or less than about 55 percent by weight of the ink carrier, and in yet another embodiment equal to or less than about 45 percent by weight of the ink carrier, although the amount can be outside of these ranges. Examples of suitable polyalkylene waxes include POLYWAX® 400 and POLYWAX® 500 (commercially available from Baker Petrolite), Vybar 103 and 253 commercially available from Baker Petrolite, POLYWAX® 655 and higher molecular weight polywax materials are also suitable. The molecular weight of the POLYWAX® can be in the range of 400 to 600 g/mole.

A dispersant can be present in the ink in any desired or effective amount for purposes of dispersing and stabilizing the pigment in the ink vehicle. The dispersant, in one embodiment of at least about $1 \times 10^{-7}$ percent by weight of the ink carrier, in another embodiment of at least about $1 \times 10^{-5}$ percent by weight of the ink carrier, and in yet another embodiment of at least about $5 \times 10^{-3}$ percent by weight of the ink carrier, and in one embodiment equal to or less than about 30 percent by weight of the ink carrier, in another embodiment equal to or less than about 20 percent by weight of the ink carrier, and in yet another embodiment equal to or less than about 10 percent by weight of the ink carrier, although the amount can be outside of these ranges. Specific examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. No. 3,172,892, U.S. Pat. No. 3,202,678, U.S. Pat. No. 3,280,034, U.S. Pat. No. 3,442,808, U.S. Pat. No. 3,361,673, U.S. Pat. No. 3,912,764, U.S. Pat. No. 5,286,799, U.S. Pat. No. 5,319,030, U.S. Pat. No. 3,219,666, U.S. Pat. No. 3,381, 022, U.S. Pat. No. 4,234,435, and European Pat. No. Publication 0 776 963, the disclosures of each of which are totally incorporated herein by reference. Where the dispersant is a polyalkylene succinimide of the formula

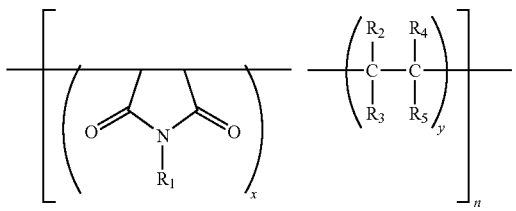

wherein x is an integer representing the number of repeating succinimide units, y is an integer representing the number of repeating alkylene units, n is an integer, $R_1$ is an alkyl group, an aryl group, an arylalkyl group, or an alkylaryl group, and $R_2$, $R_3$, $R_4$, and $R_5$ each, independently of the others, is a hydrogen atom or an alkyl group.

The ink carrier can be present in the phase change ink prepared in one embodiment in an amount of at least about 50% by weight of the ink, in another embodiment of at least about 70% by weight of the ink, and in yet another embodiment of at least about 80% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

In one specific embodiment, the ink carrier has a melting point of less than about 110° C., and in another embodiment of less than about 100° C., although the melting point of the ink carrier can be outside of these ranges.

Any desired or effective black pigment or colorant can be employed, provided that the pigment colorant can be dissolved or dispersed in the ink vehicle. In one embodiment, the black colorant is a carbon black material. Examples of suitable black colorants include Paliogen Black L0084 (commercially available from BASF); Pigment Black K801 (commercially available from BASF); and carbon blacks such as REGAL 330® (commercially available from Cabot), Carbon Black 5250, Carbon Black 5750 (commercially available from Columbia Chemical), SPECIAL BLACK® 4 (commercially available from Degussa), and the like. Mixtures of black dyes and pigments can also be employed as the colorant.

The black colorant is present in the phase change ink in any desired or effective amount to obtain the desired color or hue, in one embodiment at least about 0.1 percent by weight of the ink, in another embodiment at least about 0.2 percent by weight of the ink, and in a further embodiment at least about 0.5 percent by weight of the ink, and in one embodiment equal to or less than about 50 percent by weight of the ink, in another embodiment equal to or less than about 20 percent by weight of the ink, and in a further embodiment equal to or less than about 10 percent by weight of the ink, although the amount can be outside of these ranges.

The ink carriers can also optionally contain an antioxidant. The optional antioxidants of the ink compositions protect the images from oxidation and also protect the ink components from oxidation during the heating portion of the ink preparation process. Specific examples of suitable antioxidants are set forth in U.S. Pat. No. 6,858,070, col. 17, lines 25-36, the disclosure of which is totally incorporated herein by reference. When present, the optional antioxidant is present in the ink in any desired or effective amount, in one embodiment of at least about 0.01 percent by weight of the ink carrier, in another embodiment of at least about 0.1 percent by weight of the ink carrier, and in yet another embodiment of at least about 1 percent by weight of the ink carrier, and in one embodiment of equal to or less than about 20 percent by weight of the ink carrier, in another embodiment equal to or less than about 5 percent by weight of the ink carrier, and in yet another embodiment equal to or less than about 3 percent by weight of the ink carrier, although the amount can be outside of these ranges.

The ink disclosed herein can also contain resins and waxes such as: Crodamide 203 (commercially available from Croda), Crodamide ORX (commercially available from Croda), Kemamide S-180 and E-180 (commercially available from Witco), Unislip 1750 (commercially available from Uniqema, Uniclear 80 (commercially available from Arizona), a dicapryladipate compatibilizer such as Arizona SP-100, Vybar 263 and 243 (commercially available from Baker Petrolite), 1-docosanol (commercially available from Aldrich), Unilin 700 (commercially available from Baker Hughes), Beeswax Cerra Bellina (commercially available from Kester), branched BK-42 ester (commercially available from Kester), Kester Wax K82-D, hydroxypolyester K-82-P, synthetic Kamauba K-82-H, Siliconyl Beeswax (commercially available from Kester), stearyl alcohol 98 NF (commercially available from Kester), Kraton D1101 (commercially available from Kraton Polymers), Behenyl Behenate Behenyl behenate, straight chain even numbered mono esters having a carbon chain from C-40 to C44 (commercially available from Kester as Kester Wax 72), 1-docosanol (commercially available from Aldrich), synthetic paraffin wax of sharp melting point such as Callista 158 (commercially available from Shell), microcrystalline branched hydrocarbon waxes such as Microwax HG (commercially available from Paramelt), Mp=80-86 and Microwax P827, Kemamide S-221, polyethyleneglycol 400 distearate (commercially available from Mosselman); paraffin waxes such as HNP-9 and HNP-12 (commercially available from Nippon Seiro Co.); semi-crystalline wax such as HIMIC-2065 (commercially available from Nippon Seiro Co.); hydrogenated styrene-butadiene copolymers of low molecular weight such as Tuftec H 1141.11102 (commercially available from Asahi Kasei Corp); ethylene-propylene copolymers such as EP-700 and EP-602 (commercially available from Baker Hughes); Unithox 420 ethoxylate (commercially available from Baker Hughes); propylene-ethylene copolymer alcohols of melting point in the range of 65 to 100° C. (commercially available from Baker Hughes); maleic anhydride mono-isopropyl maleate such as Ceramer 1251 (commercially available from Baker Hughes); alpha olefin-maleic anhydride polymer of melting point of about 80 degree C. (commercially available from Baker Petrolite) (X-5399); oxidized ethene homopolymer, Petrolite C-9500 available (commercially available from Baker Hughes); oxidized 1-propene with ethane, Cardis 314, (commercially available from Baker Hughes), Victory Amber wax (commercially available from Bareco), oxidized PE such as OX-020T (commercially available from Nippon Seiro Co.); paraffin wax is a straight chain hydrocarbon having a melting point of about 49 to 71 degree C; microcrystalline wax is separated from asphalts and is higher in MW and more branched than the paraffin wax. Melting point is between 60 and 89 degree C. HNP-3, 5,9,10,11 and HNP-12 (commercially available from Nippon Seiro Co.).

The ink compositions in one embodiment have melting points of no lower than about 40° C., in another embodiment of no lower than about 60° C., and in yet another embodiment of no lower than about 70° C., and have melting points in one embodiment equal to or less than about 140° C., in another embodiment equal to or less than about 120° C., and in yet another embodiment equal to or less than about 100° C., although the melting point can be outside of these ranges.

The ink compositions generally have melt viscosities at the jetting temperature in one embodiment no lower than about 75° C., in another embodiment no lower than about 100° C., and in yet another embodiment no lower than about 120° C., and in one embodiment equal to or less than about 180° C., and in another embodiment equal to or less than about 150° C., although the jetting temperature can be outside of these ranges, in one embodiment of equal to or less than about 30 centipoise, in another embodiment of equal to or less than about 20 centipoise, and in yet another embodiment of equal to or less than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In a specific embodiment, the intermediate transfer member is maintained at a temperature that enables ink printed thereon to form a gel phase prior to forming a solid phase. In one embodiment, the intermediate transfer member is heated to a temperature of from about 4° C. above to about 60° C. below the ink melting temperature, and in another embodiment, the intermediate transfer member is heated to a temperature of from about 2° C. above to about 50° C. below the ink melting temperature, although the temperature of the intermediate transfer member can be outside of these ranges. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Low energy phase change carbon black inks, stabilized with a gelling agent and an additive to control gelling properties were formulated and printed. The gelling agent was an ester terminated polyamide resin, UNICLEAR® 100 commercially available from Arizona Chemicals. The additive to control gelling properties was ISOFOL® 36, available from Condea. Blends of ISOFOL® 36 and other lower molecular weight alcohols are also suitable.

Other materials in this ink formulation were a polyalkylene wax, POLYWAX® 400 or POLYWAX® 500, commercially available from Baker Petrolite; a dispersant, ORONITE® OL 11000 commercially available from Chevron; carbon black, SPECIAL BLACK® 4 commercially available from Degussa Canada or NIPEX® 150 carbon black commercially available from Degussa Canada, a urethane resin derived from the reaction of two equivalent of hydroabietyl alcohol and one equivalent of isophorone diisocyanate obtained as described herein Compound A and a urethane resin that is the adduct of three equivalents of stearyl isocyanate and a glycerol-based alcohol obtained as described herein, Compound B, stearyl alcohol, commercially available from Koster Keunen; and antioxidant, NAUGUARD® 445 commercially available from Uniroyal.

Typical formulations that meet the filtration (0.45 micron), jetting, transfuse requirements are set forth in Table 1 below:

TABLE 1

| Ink Component | Sample # | | | | | |
|---|---|---|---|---|---|---|
| | A no Guerbet alcohol g | B | C | D with Guerbet alcohol g | E | F |
| Polywax 400 | 57.10 | 41.98 | 41.98 | 41.98 | 41.98 | 0.00 |
| Polywax 500 | 0.00 | 0.00 | 0.00 | 0.00 | 0.00 | 42.00 |
| Isofol 36 alcohol | 0.00 | 25.00 | 23.50 | 21.50 | 21.50 | 20.00 |
| Stearyl alcohol | 13.00 | 0.00 | 0.00 | 0.00 | 0.00 | 3.98 |
| Uniclear 100 | 14.00 | 12.00 | 12.00 | 14.00 | 14.00 | 12.00 |
| Compound A | 6.00 | 11.30 | 11.30 | 11.30 | 9.30 | 9.30 |
| Compound B | 4.90 | 4.72 | 4.72 | 4.72 | 5.72 | 5.72 |
| Special Black 4 | 4.00 | 4.00 | 0.00 | 0.00 | 0.00 | 4.00 |
| Nipex 150 | 0.00 | 0.00 | 3.50 | 3.50 | 3.50 | 0.00 |
| OL 11000 | 0.80 | 0.80 | 2.80 | 2.80 | 3.80 | 2.80 |
| Naugard 445 | 0.20 | 0.20 | 0.20 | 0.20 | 0.20 | 0.20 |
| Total (g) | 100.00 | 100.00 | 100.00 | 100.00 | 100.00 | 100.00 |

The above ink formulation components can be combined to form a black low energy phase change ink by a number of acceptable processes such as those described in U.S. Pat. No. 6,858,070, the disclosure of which is totally included here by reference. Compound A is described in U.S. Pat. No. 6,858,070 column 12, line 37-39, and Compound B described in U.S. Pat. No. 6,858,070 column 12, line 48-50.

Example A

First, the SPECIAL BLACK® 4 carbon black and the UNICLEAR® 100 ester terminated polyamide resin were melted at 135° C. inside an oven for 1 hour. The dispersant, ORONITE® OL 11000, was added to the melt to form a dispersion. This dispersion was then stirred mechanically (400 rpm) at 125-130° C. for 15 minutes. Next, melted stearyl alcohol, together with 0.1 g of NAUGUARD® 445 antioxidant (half of the total required amount) was added to the dispersion and stirred for another 15 minutes at 400 rpm. The resulting dispersion was homogenized for 12 minutes at 125° C. at 10,000 rpm using an IKA ULTRA TURAX T50 homogenizer. The remaining melted ingredients, a polyalkylene wax, POLYWAX® 400, Compound A, Compound B, and the remaining amount of antioxidant, 0.1 g, NAUGUARD® 445, were added to the above dispersion and the dispersion was further homogenized for another 9 minutes at 6,000 rpm with the temperature maintained below 125° C. The resulting ink was then filtered through a series of glass fiber filter papers from 10 microns to 6 microns to 2 microns to 1 micron and down to 0.45 micron. The filtered ink was then successfully printed on XEROX® 4024 paper (transfuse pressure of 450 psi load) and Warren Lustro Gloss coated paper (transfuse pressure of 500 psi load) using a modified Xerox® Phaser 860 printer, modifications that allow printing at lower temperatures, with the following temperature set points: (1) a jetting temperature of 110 degrees C., (2) a drum temperature of 40 degrees C.; (3) a preheat temperature of 70 degree C. to give images having excellent print quality, good optical density and high gloss (75 degree C. gloss=57).

Example B

First, the SPECIAL BLACK® 4 carbon black and the UNICLEAR® 100 ester terminated polyamide resin were melted at 135° C. inside an oven for 1 hour. The dispersant, ORONITE® OL 11000, was added to the melt to form a dispersion. This dispersion was then stirred mechanically (400 rpm) at 125-130° C. for 15 minutes. Next, melted ISOFOL® 36 alcohol, together with 0.1 g of NAUGUARD® 445 antioxidant (half of the total required amount) was added to the dispersion and stirred for another 15 minutes at 400 rpm. The resulting dispersion was homogenized for 12 minutes at 125° C. at 10,000 rpm using an IKA ULTRA TURAX T50 homogenizer. The remaining melted ingredients, a polyalkylene wax, POLYWAX® 400, Compound A, Compound B, and the remaining amount of antioxidant, 0.1 g, NAUGUARD® 445, were added to the above dispersion and the dispersion was further homogenized for another 9 minutes at 6,000 rpm with temperature maintained below 125° C. The resulting ink was then filtered through a series of glass fiber filter papers from 10 microns to 6 microns to 2 microns to 1 micron and down to 0.45 micron.

The filtered ink was then successfully printed on XEROX® 4024 paper (transfuse pressure of 450 psi load) and Warren Lustro Gloss coated paper (transfuse pressure of 500 psi load) using a modified Xerox® Phaser 860 printer with the following temperature set points: (1) a jetting temperature of 110° C., (2) a drum temperature of 45° C.; (3) a preheat temperature of 75° C. to give images having excellent print quality, good optical density, high gloss (75° C. gloss=53) and low showthrough, about 0.05 OD unit.

The dynamic rheological properties of inks A and B were further obtained under a set of standard conditions using a Rheometric Instrument RFS III, showing both that inks of this class exhibit good jetting viscosities of from about 8 to about 15 centipoises, at temperature as low as about 105° C. (low energy inks), and good transfuse/fusing characteristics (>$10^7$ cps at the drum temperature or below). The data also show the effect of using a high molecular weight Guerbet alcohol in the ink as opposed to a lower molecular weight monofunctional linear alcohol such as stearyl alcohol. Particularly, the data clearly shows a widening of the melt transition for the inks containing a Guerbet alcohol such as ISOFOL® 36. The difference in temperature between the onset of crystallization in the cooling cycle with the end point of the melt transition in the melt cycle is about 12° C., from about 80° C. to about 92° C. for Sample B. For an ink containing a linear alcohol such as stearyl alcohol [Sample A], this transition is only about 3° C., from about 85° C. to about 88° C. This widening of the melt transition can be attributed to an increase in the effectiveness of the gelling agent when used in combination with a branched alcohol. The rheology of Sample B was subsequently measured under slightly different experimental conditions to highlight a plateau-like transition at about 500 cps. A plateau-like transition area, in the range of 88° C. to 94° C., was attributed to the presence of a gel transition between the solid and liquid phase of the ink.

Four additional inks, C, D, E and F were prepared by the process described for Example A and B using the ink components and concentrations shown in Table 1. Stable inks were obtained. The inks can also be printed on a modified XEROX® Phaser 860 printer to give images of print quality on plain paper.

The invention claimed is:

1. A black phase change ink composition comprising (1) a low polarity ink carrier comprising (A) an ester-terminated polyamide in an amount ranging from at least about 0.5% by weight to about 20% by weight (B) a Guerbet alcohol mixture and at least one linear alcohol, and (C) a low polarity wax, and (2) a black colorant, said ink being capable of resisting substantial aggregation and settling of the black colorant at a temperature between about the stand by mode printer temperature for the ink and the jetting temperature of the ink.

2. A phase change ink according to claim 1, which comprises a low energy phase change ink wherein the ink exhibits at least one of a substantially low jetting temperature of less than about 135° C., a substantially low standby temperature of less than about 105° C., and a substantially low intermediate substrate (drum) temperature of less than about 65° C.

3. A phase change ink according to claim 1, wherein the ester-terminated polyamide is present in the low polarity ink carrier in an amount of at least about 0.5% by weight.

4. A phase change ink according to claim 1, wherein the low polarity wax is present in the low polarity ink carrier in an amount of from about 25% up to about 65% by weight.

5. A phase change ink according to claim 1, which further includes a dispersant.

6. A phase change ink according to claim 1, wherein the Guerbet alcohol or a Guerbet alcohol mixture with at least one linear alcohol is present in the low polarity ink carrier in an amount of from about 5% to equal to or less than about 65% by weight.

7. A phase change ink according to claim 1, which further includes an additive to control gelling properties which comprises 2-tetradecyl 1-octadecanol or 2-hexadecyl-1-eicosanol, or mixtures thereof.

8. A phase change ink according to claim 1 wherein the linear alcohol is selected from the group consisting of 1-tetradecanol, 1-pentadecanol, 1-hexadecanol, 1-heptadecanol, 1-octadecanol (stearyl alcohol), 1-nonadecanol, 1-eicosanol, 1-docosanol, 1-tricosanol, 1-tetracosanol, 1-pentacosanol, 1-hexacosanol, 1-heptacosanol, 1-octacosanol, 1-nonacosanol, 1-tricontanol, 1-dotriacontanol, 1-tritriacontanol, 1-tetratriacontanol, 1,8 octanediol, 1,9 nonanediol, 1,10 decanediol, 1,12 dodecanediol, 1,13 tridecanediol, 1,14 tetradecanediol, 1,15 pentadecanediol, 1,16 hexandecanediol, 1,17 heptadecanediol, 1,18 octadecanediol, 1,19 nonadecanediol, 1,20 eicosanediol, 1,22 docosanediol, 1,25 pentacosanediol, or mixtures thereof.

9. A phase change ink according to claim 1, when the standby-mode printer temperature for the ink is less than about 105° C. or equal to or less than about the gel temperature for the ink.

10. A phase change ink according to claim 1, which has a broad melting transition range of between about 3 to about 20° C. and a plateau-like viscosity, in the transition region, of at least about 100 cps.

11. A phase change ink according to claim 5, wherein the dispersant is a polyalkylene succinimide of the formula

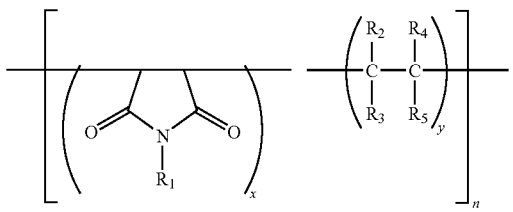

wherein x is an integer representing the number of repeating succinimide units, y is an integer representing the number of repeating alkylene units, n is an integer, $R_1$ is an alkyl group, an aryl group, an arylalkyl group, or an alkylaryl group, and $R_2$, $R_3$, $R_4$, and $R_5$ each, independently of the others, is a hydrogen atom or an alkyl group.

12. A phase change ink according to claim 1, wherein said low polarity wax comprises a polyethylene wax.

13. A phase change ink according to claim 1, wherein the black colorant is a carbon black material.

14. A method for producing a black phase change ink composition comprising (1) a low polarity ink carrier comprising (A) an ester-term mated polyamide in an amount ranging from at least about 0.5% by weight to about 20% by weight (B) a Guerbet alcohol mixture and at least one linear alcohol, and (C) a low polarity wax, and (2) a black colorant, said ink being capable of resisting substantial aggregation and settling of the black colorant at a temperature between about the stand by mode printer temperature for the ink and the jetting temperature of the ink.

15. A method according to claim 14, wherein the ester-terminated polyamide is present in the low polarity ink carrier in an amount of at least about 0.5% by weight.

16. A method according to claim 14, wherein said low polarity wax comprises a polyethylene wax, and said black colorant is a carbon black material.

17. A method according to claim 14, wherein the low polarity wax is present in the low polarity ink carrier in an amount of from about 25% to equal to or less than about 65% by weight.

18. A method according to claim 14, which further includes adding a dispersant to the low polarity ink carrier.

19. A method according to claim 14, which further includes combining with the low polarity ink carrier an additive to control gelling properties which comprises a high molecular weight alcohol.

20. A method according to claim 14, wherein the standby-mode printhead temperature for the ink produced thereby is less than about 105° C. or equal to or less than about the gel temperature for the ink.

21. A method which comprises (a) incorporating into an ink jet printing apparatus a low energy phase change ink composition comprising (1) a low polarity ink carrier comprising (A) an ester-terminated polyamide in an amount ranging from at least about 0.5% by weight to about 20% by weight, and (B) a low polarity wax, and (2) a black colorant; melting the low energy phase change ink composition; and (c) causing droplets of the melted ink to be ejected at a temperature in an image wise pattern onto a substrate.

22. A method according to claim 21, which further includes a transfix step.

23. A method according to claim 21, which further comprises post-fusing of the image wise pattern with the application of heat.

24. A method according to claim 21, which further comprises post-fusing of the image wise pattern with the application of heat and pressure.

25. A method according to claim 21, wherein the substrate is a final recording sheet and droplets of the melted ink are ejected in an imagewise pattern directly onto the final recording sheet.

26. A method according to claim 21, wherein the substrate is an intermediate transfer member and droplets of the melted ink are ejected in an imagewise pattern onto the intermediate transfer member followed by transfer of the imagewise pattern from the intermediate transfer member to a final recording sheet.

27. A method according to claim 26, wherein the intermediate transfer member is heated to a temperature above that of the final recording sheet and below that of the melted ink in the printing apparatus.

28. A low energy black phase change ink composition comprising (1) a low polarity ink carrier comprising (A) an ester-terminated polyamide, (B) a high molecular weight alcohol, and (C) a low polarity wax, and (2) a black colorant, said ink being capable of resisting substantial aggregation and settling of the black colorant at a temperature wherein the standby-mode printer temperature for the ink is not more than about the gel temperature of the ink.

\* \* \* \* \*